United States Patent
Kwon

(10) Patent No.: US 10,203,792 B2
(45) Date of Patent: Feb. 12, 2019

(54) DISPLAY DEVICE WITH BUILT-IN TOUCH SENSORS

(71) Applicant: LG Display Co., Ltd., Seoul (KR)

(72) Inventor: Kitae Kwon, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 15/712,745

(22) Filed: Sep. 22, 2017

(65) Prior Publication Data
US 2018/0095573 A1   Apr. 5, 2018

(30) Foreign Application Priority Data

Sep. 30, 2016  (KR) .......................... 10-2016-0127122

(51) Int. Cl.
| | | |
|---|---|---|
| G06F 3/041 | (2006.01) | |
| G06F 3/044 | (2006.01) | |
| G02F 1/1343 | (2006.01) | |
| G02F 1/1333 | (2006.01) | |

(52) U.S. Cl.
CPC .......... *G06F 3/0412* (2013.01); *G02F 1/1343* (2013.01); *G06F 3/044* (2013.01); *G06F 3/0418* (2013.01); *G02F 1/13338* (2013.01); *G06F 2203/04112* (2013.01)

(58) Field of Classification Search
CPC ...... G06F 3/0412; G06F 3/0418; G06F 3/044; G06F 2203/04112; G02F 1/13338; G02F 1/1343
See application file for complete search history.

(56) References Cited

U.S. PATENT DOCUMENTS

| | | | | |
|---|---|---|---|---|
| 9,600,130 B2* | 3/2017 | Kim | ....................... | G06F 3/044 |
| 2012/0056834 A1* | 3/2012 | Kim | ....................... | G06F 3/0418 |
| | | | | 345/173 |
| 2012/0293560 A1 | 11/2012 | Li et al. | | |

(Continued)

FOREIGN PATENT DOCUMENTS

KR   10-2013-0065355 A   6/2013

OTHER PUBLICATIONS

Extended European Search Report dated Feb. 23, 2018 from the European Patent Office in counterpart EP application No. 17193129.8.

*Primary Examiner* — Ryan A Lubit
(74) *Attorney, Agent, or Firm* — Morgan, Lewis & Bockius LLP

(57) ABSTRACT

A display device includes a display panel having a pixel array and built-in touch sensors, with a shared common electrode, driven between display and touch sensing periods; a display drive circuit outputting image data to the display panel during the display period; a common voltage regulator outputting common voltage data to indicate a common voltage to be applied to the common electrode during the touch sensing period; and a touch sensing circuit decoding the common voltage data during the touch sensing period to vary the common voltage and applying the varied common voltage to the common electrode. The common voltage regulator determines an average value of image data for each line of the pixel array and outputs a first common voltage data to decrease the voltage level of the common voltage when the average value is at or above a preset threshold and corresponds to positive image data.

10 Claims, 7 Drawing Sheets

(56) References Cited

U.S. PATENT DOCUMENTS

| | | | |
|---|---|---|---|
| 2014/0043281 A1* | 2/2014 | Kim | G06F 3/044 |
| | | | 345/174 |
| 2014/0176839 A1 | 6/2014 | Oh et al. | |
| 2016/0078832 A1* | 3/2016 | Ota | G06F 3/0412 |
| | | | 345/212 |
| 2017/0213499 A1* | 7/2017 | Kong | G06F 3/0412 |

* cited by examiner

FIG. 9
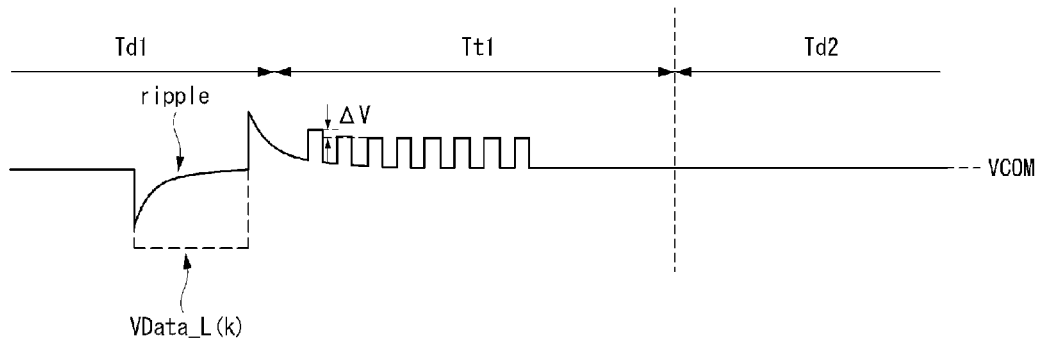
FIG. 10
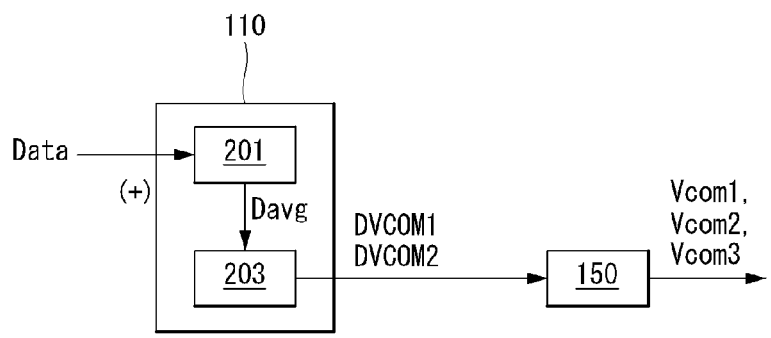
FIG. 11
| Data 1 (+) | Data 2 (−) | Data 3 (+) | .... | Data (m−1) (+) | Data (m) (−) |
|---|---|---|---|---|---|

DISPLAY DEVICE WITH BUILT-IN TOUCH SENSORS

This application claims the priority benefit of Korean Patent Application No. 10-2016-0127122 filed on Sep. 30, 2016, which is incorporated herein by reference for all purposes as if fully set forth herein.

BACKGROUND

Technical Field

This document relates to a display device, and more particularly, to a display device with built-in touch sensors.

Discussion of the Related Art

In recent years, flat-panel displays (or display devices) with large size, low price, and high display quality (video representation, resolution, brightness, contrast ratio, color reproducibility, etc.) have been increasingly developed to meet the need for display devices capable of properly displaying multimedia content, along with multimedia development. For such flat-panel displays, various input devices, such as a keyboard, a mouse, a trackball, a joystick, a digitizer, etc., may be used to configure an interface between a user and a display device. However, using such input devices requires the user to learn how to use them, and also they take up space for installation and operation, making it difficult to increase the maturity of the products. In light of this situation, there is a growing demand for input devices for displays that are convenient, easy to use, and can reduce glitches. In response to this demand, a touch sensor has been introduced in which an input is detected when the user enters information while viewing the display device by directly touching the screen with their hand or a pen or moving it near the screen.

Touch sensors for use in display devices may be implemented as in-cell touch sensors that are embedded in a display panel. An in-cell touch display uses a method in which a touch sensor's touch electrode and the display panel's common electrode are used together. Here, driving is done in a time-sharing manner, separately in a display period and a touch sensing period. That is, the common electrode receives a common voltage during the display period and a touch drive signal during the touch sensing period.

Because the common electrode has a parasitic capacitance with a data line, data voltages applied to the data line during the display period cause the voltage applied to the common electrode to change due to capacitive coupling, thereby causing a ripple in the common electrode voltage. When there is a ripple in the common electrode voltage, especially at the end of the display period, it affects the voltage level of the touch drive signal in the initial part of the touch sensing period, thus generating touch noise.

SUMMARY

Accordingly, embodiments of the present disclosure are directed to a display device with built-in touch sensors that substantially obviates one or more of the problems due to limitations and disadvantages of the related art.

Features and aspects of the present disclosure will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

To achieve these and other aspects of the inventive concepts, as embodied and broadly described, a display device comprises a display panel having a pixel array with built-in touch sensors configured to be driven between a display period and a touch sensing period in a time-division manner, the pixels and the touch sensors sharing a common electrode; a display drive circuit configured to output image data to the display panel during the display period; a common voltage regulator configured to output common voltage data to indicate a voltage level of a common voltage to be applied to the common electrode during the touch sensing period; and a touch sensing circuit configured to decode the common voltage data during the touch sensing period to vary the common voltage and to apply the varied common voltage to the common electrode to drive the touch sensors, wherein the common voltage regulator is configured to determine an average value of image data for each line of the pixel array and to output a first common voltage data to decrease the voltage level of the common voltage when the average value is at or above a preset threshold and corresponds to positive image data.

It is to be understood that both the foregoing general description and the following detailed description are exemplary and explanatory and are intended to provide further explanation of the inventive concepts as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIGS. 7 to 9 are views for explaining a ripple in a common voltage;

FIG. 10 is a view of the configuration of a common voltage regulator;

FIG. 11 is a view of an example of image data for one line; and

DETAILED DESCRIPTION

Figure 1:
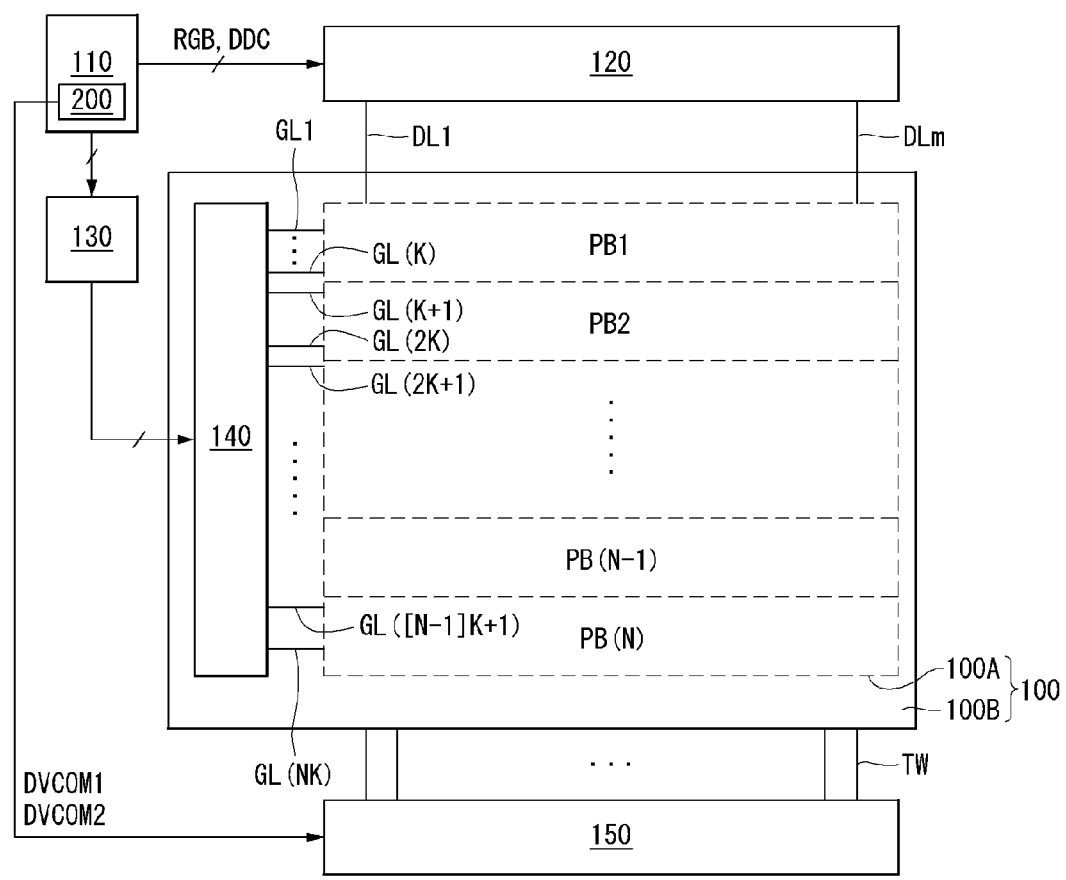
FIG. 1 is a view of a display device with built-in touch sensors according to the present invention.

Hereinafter, exemplary embodiments of the present invention will be described in detail with reference to the attached drawings. Throughout the specification, like reference numerals denote substantially like components. In describing the present invention, a detailed description of known functions or configurations related to the present invention will be omitted when it is deemed that they may unnecessarily obscure the subject matter of the present invention. The terms and names of elements used herein are chosen for ease of description and may differ from names used in actual products.

Figure 2:
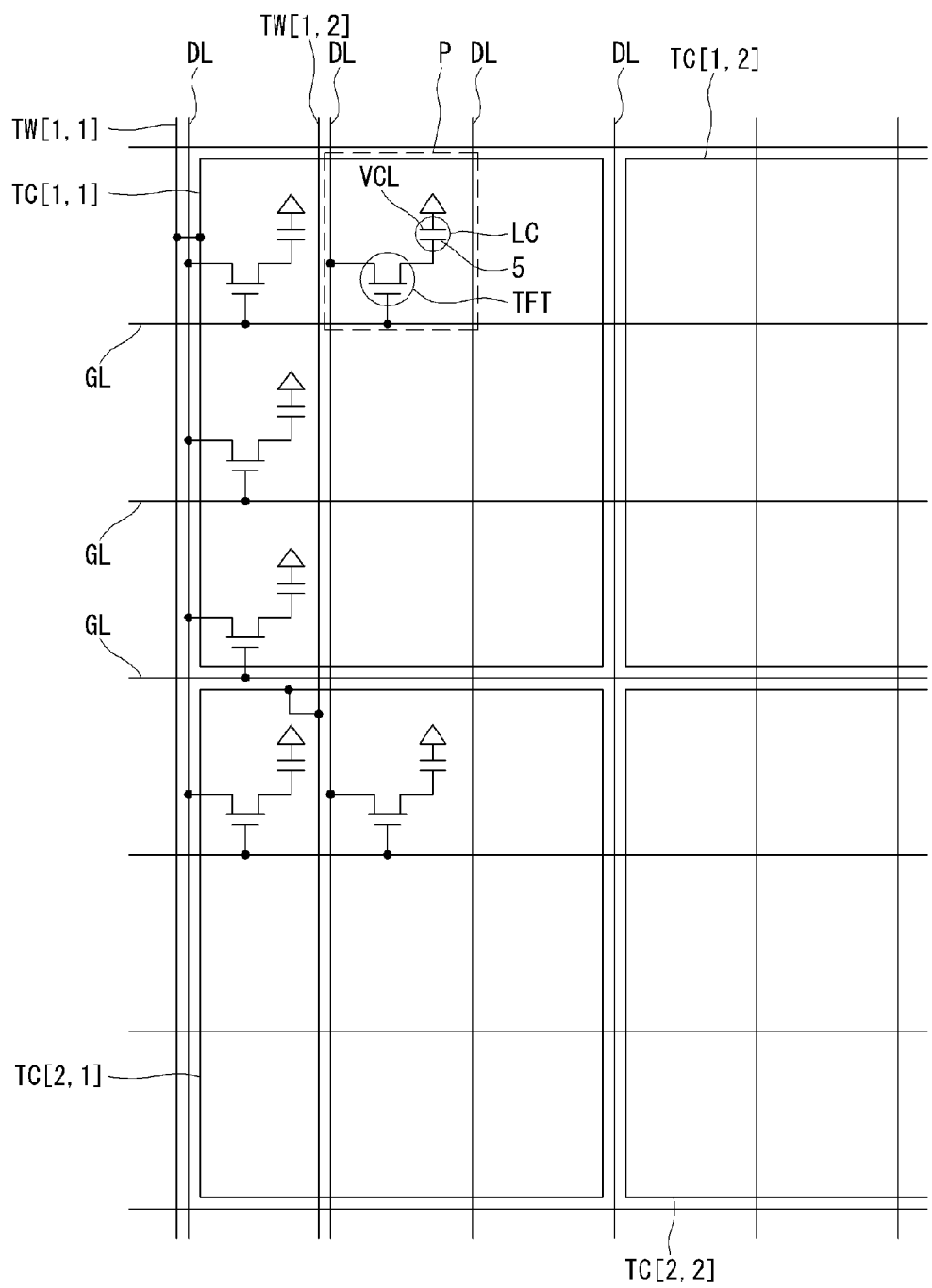
FIG. 2 is a plan view of part of a pixel array according to an example embodiments of the present invention.
Figure 3:
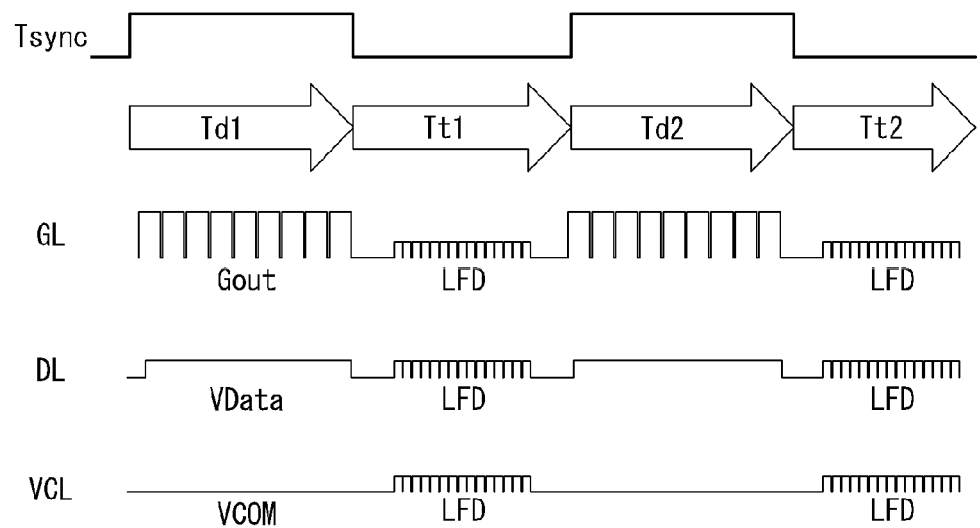
FIG. 3 is a view of drive signals in a display device according to example embodiments of the present invention.

FIG. 1 is a view of a display device with built-in touch sensors according to example embodiments of the present invention. FIG. 2 is a view of pixels included in touch sensors. FIG. 3 is a view of signals that a drive circuit section outputs to signal lines. Although individual touch sensors and sensing lines in FIGS. 1 to 3 are indicated by the respective reference numerals, they will be referred to as "touch sensors TC" and "sensing lines TW" in the following description when commonly designated, regardless of their positions.

In FIGS. 1 to 3, a display device with built-in touch sensors comprises a display panel 100, a display drive circuit, and a touch sensing circuit 150. The display drive circuit comprises a timing controller 110, a data drive circuit 120, a level shifter 130, and a shift register 140.

The display panel 100 comprises a pixel array 100A and a non-display portion 1006. Pixels P for displaying image information and touch sensors TC are disposed on the pixel array 100A. The non-display portion 100B is disposed around the pixel array 100A.

The pixel array 100A is divided into N panel blocks PB1 to PB[N], and image display and touch sensing are done on per panel block PB. Each of the panel blocks PB1 to PB[N] comprises K pixel lines (K being a natural number), and each pixel line is connected to first to Kth gate lines G1 to G[K].

The pixel array 100A on the display panel 100 comprises data lines DL, gate lines GL, thin-film transistors TFT formed at the intersections of the data lines DL and the gate lines GL, pixel electrodes 5 connected to the thin-film transistors TFT, and storage capacitors Cst connected to the pixel electrodes 5. The thin-film transistors TFT turn on in response to gate pulses from the gate lines GL, and supply the pixel electrodes 5 with data voltages applied through the data lines DL. A liquid crystal layer LC is driven by the voltage difference between the data voltages stored in the pixel electrodes 5 and a common voltage VCOM applied to a common electrode VCL to adjust the amount of light transmission.

The touch sensors TC are connected to a plurality of pixels, and are implemented as capacitive touch sensors to sense touch input. Each touch sensor TC may comprise a plurality of pixels P. FIG. 2 depicts that 9 pixels P arranged in a 3×3 matrix are allocated for one touch sensor TC, although embodiments are not limited thereto. Because the common electrode VCL is divided per touch sensor TC, the area occupied by the common electrode VCL may be designated as the touch sensors TC. One sensing line TW is allocated and connected to each touch sensor TC. For example, the sensing line TW[1,1] in the first row and first column is connected to the touch sensor TC[1,1] in the first row and first column, and the sensing line TW[1,2] in the first row and second column is connected to the touch sensor TC[1,2] in the first row and first column.

The common electrode VCL is supplied with a common voltage VCOM, a reference voltage for the pixels, during a display period, and is supplied with a touch drive signal LFD during a touch sensing period.

The display drive circuit comprises a timing controller 110, a data driver 120, and a gate driver 130 and 140, and provides data for an input image to the pixels P on the display panel 100. The display drive circuit divides one frame period into a plurality of display periods and a plurality of touch sensing periods, and provides data for an input image to the pixels on a per-block basis during the display periods.

The timing controller 110 transmits, to the data driver 120, data for an input image received from a host system (not shown). The timing controller 110 outputs data timing control signals for controlling the operation timing of the data driver 120 and gate timing control signals for controlling the operation timing of the gate driver 130 and 140 using timing signals, such as a vertical synchronization signal Vsync, a horizontal synchronization signal Hsync, a data enable signal DE, and a main clock MCLK, that are received from the host system in synchronization with the input image data. The timing controller 110 allows the display drive circuit and the touch sensing circuit 150 to work in synchronization with each other.

Moreover, the timing controller 110 comprises a common voltage regulator 200 for varying the common voltage applied to the common electrode VCL during the touch sensing periods. The common voltage regulator 200 may be mounted in the timing controller 110, as shown in FIG. 1, or may be disposed outside the timing controller 110. A detailed description of the common voltage regulator 200 will be given later.

The data driver 120 receives image data from the timing controller 110 during the display periods Td1, Td2, . . . , and converts it to positive/negative gamma compensation voltages and outputs positive/negative data voltages.

The gate driver 130 and 140 sequentially supplies gate pulses to the gate lines GL under the control of the timing controller 110. The gate pulses output from the gate driver 130 and 140 are synchronized with the data voltages. The gate driver 130 and 140 comprises a level shifter 130 connected between the timing controller 110 and the gate lines on the display panel 100, and a gate shift register 140. The level shifter 130 level-shifts the TTL (transistor-transistor-logic) logic level voltage of gate clocks CLK input from the timing controller 110 to a gate-high voltage VGH and a gate-low voltage VGL. The shift register 140 has stages that shift a start signal VST in sync with a gate clock CLK and sequentially output a gate pulse Gout.

The touch sensing circuit 150 drives the touch sensors during the touch sensing periods, in response to a touch enable signal Tsync input from the timing controller 110 or the host system. The touch sensing circuit 150 senses touch input by supplying a touch drive signal LFD to the touch sensors TC through the sensing lines TW during the touch sensing periods. The touch sensing circuit 150 determines if there is a touch input by analyzing the rate of change of current in the touch sensors, which varies depending on the presence or absence of a touch input, and calculates the coordinates of a touch position. The coordinate information of the touch position is transmitted to the host system.

FIG. 3 is a waveform diagram of drive signals in a display device according to an exemplary embodiment of the present invention. In FIG. 3, GL is a voltage applied to the gate lines GL, and DL is a voltage applied to the data lines DL. VCL is a voltage applied to the common electrode VCL.

With reference to FIG. 3, one frame period may be divided into a plurality of display periods Td1, Td2, . . . and a plurality of touch sensing periods Tt1, Tt2, . . . The display drive circuit 110, 120, 130, and 140 outputs current frame data to the pixels in the first panel block PB1 during the first display period Td1 to update an image reproduced on the first panel block PB1 with the current frame data.

During the first display period Td1, the other panel blocks PB2 to PBN, other than the first panel block PB1, retain previous frame data, and the touch sensing circuit 150 does not drive the touch sensors. Subsequently, the touch sensing circuit 150 sequentially drives all the touch sensors during the first touch sensing period Tt1 to sense touch inputs, creates a touch report containing coordinate information and identification information ID for each touch input, and transmits it to the host system. The touch sensing circuit 150 supplies a touch sensor drive signal to the touch sensors through the sensing lines TW during the touch sensing period Tt1 to detect the amount of electric charge in the touch sensors before and after a touch input, and compares the detected amount of electric charge with a threshold voltage to determine whether a touch has been made.

Subsequently, the display drive circuit 110, 120, 130, and 140 writes current frame data to the pixels in the second panel block PB2 during the second display period Td2 to update an image reproduced on the second panel block PB2 with the current frame data. During the second display period Td2, the first panel block PB1 retains previous frame data, and the touch sensing circuit 150 does not drive the touch sensors. Subsequently, the touch sensing circuit 150 sequentially drives all the touch sensors during the second touch sensing period Tt2 to sense touch inputs, creates a touch report containing coordinate information and identification information ID for each touch input, and transmits it to the host system.

In this way, each of the panel blocks PB1 to PBN is driven in a time-sharing manner, and the touch sensing circuit 150 drives the touch sensors after each panel block PB1 to PBN has been driven. The touch sensing circuit 150 supplies a touch sensor drive signal to the touch sensors through the sensing lines TW during the touch sensing periods Tt1 and Tt2 to detect the amount of electric charge in the touch sensors before and after a touch input, and compares the detected amount of electric charge with a threshold voltage to determine whether a touch has been made.

The touch sensing circuit 150 may transmit a touch report to the host system at a touch report rate higher than the frame rate. For example, for a frame rate of 60 Hz, the touch report rate may be 120 Hz or higher. Frame rate is the frequency at which one frame image is written to the pixel array. Touch report rate is the speed at which coordinate information of a touch position is generated. The higher the touch report rate, the faster the coordinates of the touch position can be detected and therefore the better the touch sensitivity.

The data driver 120 may supply a touch drive signal LFD of the same phase and voltage as the touch sensor drive signal during the touch sensing periods Tt1 and Tt2 to reduce the parasitic capacitance between the pixels P and the touch sensors TC. Likewise, the gate driver 130 and 140 may supply a touch drive signal LFD of the same phase and voltage as the touch sensor drive signal during the touch sensing periods Tt1 and Tt2 to reduce the parasitic capacitance between the pixels P and the touch sensors TC. The touch sensing circuit 150 supplies a touch drive signal LFD to other sensor lines as well, apart from those connected to the touch sensors that are currently sensing touch input, to prevent parasitic capacitance between neighboring touch sensors.

In a display device with built-in in-cell touch sensors, the touch sensors TC are attached to the pixels P. Thus, parasitic capacitance occurs between the touch sensors TC and the pixels P. Due to the parasitic capacitance between the touch sensors and the pixels, the touch sensitivity and touch detection accuracy of the touch sensors may be reduced.

By supplying a touch drive signal LFD of the same phase as the touch sensor drive signal during the touch sensing periods Tt1 and Tt2 to the data lines DL1 to DLm and gate lines GL on the display panel 100 and to the touch sensors that are not currently connected, the amount of charge in the parasitic capacitance of the display panel 100 may be reduced. This is because the amount of charge in the parasitic capacitance may be minimized by minimizing the voltage difference between two ends of the parasitic capacitance. Reducing the parasitic capacitance of the touch sensors may improve the signal-to-noise ratio (hereinafter, "SNR") of the touch sensor drive signal, thereby widening the operation margin of the touch sensing circuit and enhancing touch input and touch sensitivity.

Further, touch noise may be reduced using the touch drive signal LFD, but a ripple may occur in the common voltage applied to the common electrode, due to the polarity of the data voltages applied at the end of the display periods Td. As a result, touch noise may not be completely eliminated. A description will be given below of inconsistency in the voltage level of the common voltage due to the asymmetric polarity distribution of the data voltages and the ripple in the common voltage.

Figure 4:
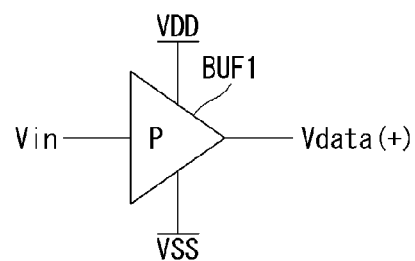
FIG. 4 is a view of output buffers of a data driver.
Figure 4:
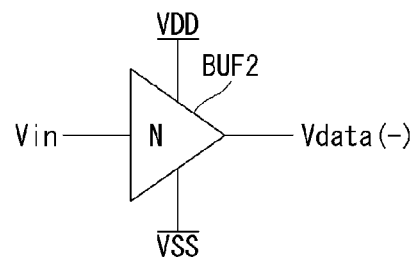
Figure 5:
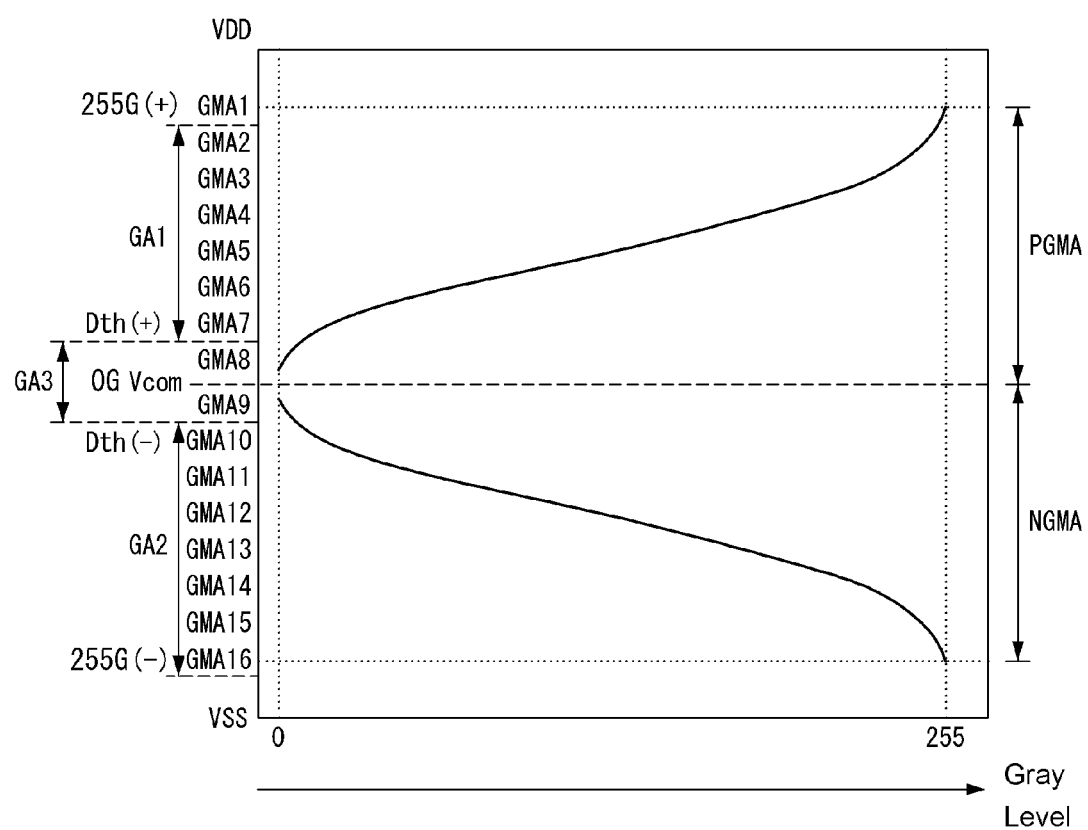
FIG. 5 is a view of gamma voltages from the data driver.

FIG. 4 is a view of output buffers of the data driver. FIG. 5 is a view of data voltages (gamma voltages) output by the output buffers.

With reference to FIGS. 4 and 5, the data driver 120 comprises first and second output buffers BUF1 and BUF2 to output positive/negative data voltages. The first output buffer BUF1 outputs positive data voltages Vdata(+) for representing positive image data of gray levels 0 to 255G(+), and the second output buffer BUF2 outputs negative data voltages Vdata(-) for representing negative image data of gray levels 0 to 255G(-). As the first and second output buffers BUF1 and BUF2, operational amplifiers OP-AMP that are supplied with power supply voltages VDD and VSS may be used.

Figure 6:
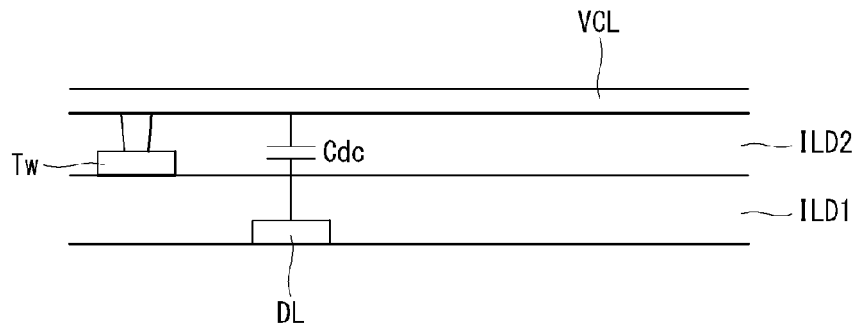
FIG. 6 is a view for explaining parasitic capacitance between a data line and a common electrode.
Figure 7:
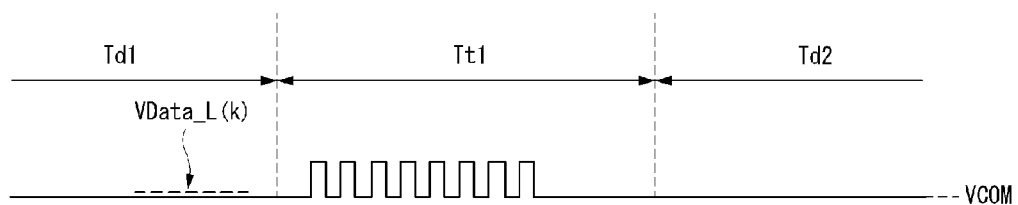
Figure 8:
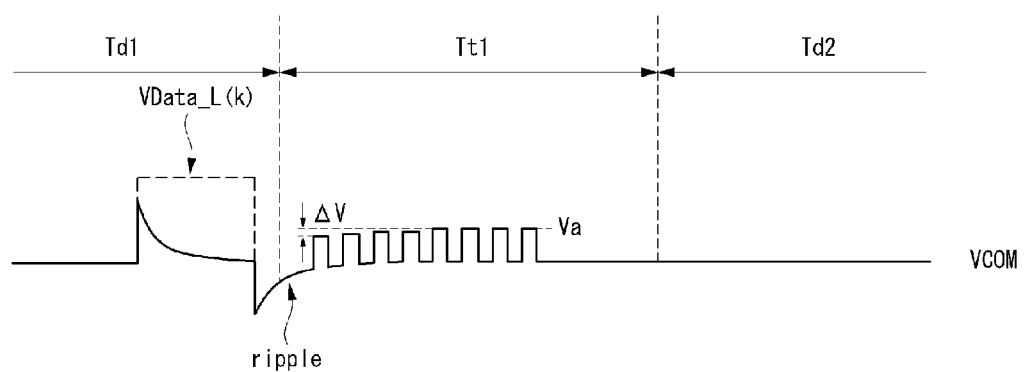

FIG. 6 is a view for explaining parasitic capacitance between a data line and a common electrode. FIGS. 7 to 9 are views for explaining a ripple in common voltage.

As shown in FIGS. 6 to 9, a data line DL and the common electrode VCL may be disposed with first and second interlayer insulating films ILD1 and ILD2 in between them. The data line DL receives data voltages during the display period Td1. The common voltage VCL receives a common voltage VCOM through a sensing line TW during the display period Td1, and receives a touch drive signal LFD during the touch sensing period Tt1.

During the first display period Td1, the data line DL sequentially receives data voltages applied to the first to $k^{th}$ pixel lines. At the end of the first display period Td1, the voltage of the data line DL changes from the kth data voltage Vdata_L[k] applied to the $k^{th}$ pixel line to the common voltage VCOM corresponding to gray level 0 (0G).

As shown in FIG. 7, when the $k^{th}$ data voltage Vdata_L[k] is equal to the common voltage VCOM, the voltage applied to the data line DL does not change at the end of the first display period Td1. As a result, the voltage of the common electrode VCL that forms parasitic capacitance Cdc with the data line DL does not change.

As shown in FIG. 8, when the $k^{th}$ data voltage Vdata_L[k] is larger than the common voltage VCOM, the voltage applied to the data line DL changes to a lower voltage at the end of the first display period Td1. As a result, the voltage of the common electrode VCL which forms parasitic capacitance Cdc with the data line DL is lowered.

Because the common voltage VCOM is applied in the initial parts of the touch sensing periods Tt, the voltage of the common electrode VCL, which is lowered due to capacitive coupling, gradually rises to the common voltage VCOM at the start of the first touch sensing period Tt1. That is, at the start of the first touch sensing period Tt1, the common voltage VCOM is not kept at a constant level but instantaneously changes—that is, a ripple occurs.

The touch drive signal LFD swings within the ranges of the common voltage VCOM and sensing high voltage Va. Due to the ripple, the high voltage level of the touch drive signal LFD is not kept at the sensing high voltage Va but a voltage variation $\Delta V$ occurs in the initial part of the first touch sensing period Tt1. As a result, the touch drive signal LFD does not have the same voltage level as the touch drive signal LFD applied to the data line DL and the gate line GL. Thus, touch noise is not properly eliminated. Consequently, touch noise may occur in the initial stage of the first touch sensing period Tt1.

FIG. 9 is a view for explaining a ripple that occurs when the $k^{th}$ data voltage Vdata_L[k] is smaller than the common voltage VCOM. When the $k^{th}$ data voltage Vdata_L[k] is smaller than the common voltage VCOM, the voltage applied to the data line DL increases at the end of the first display period Td1, and the voltage of the common electrode VCL also increases. As a result, at the start of the first touch sensing period TT1, the common voltage VCOM is not kept at a constant level but instantaneously changes—that is, a ripple occurs. Due to the ripple, touch noise occurs in the initial stage of the first touch sensing period Tt1. The common voltage regulator 200 varies the level of the common voltage VCOM in order to eliminate touch noise caused by a ripple.

FIG. 10 is a view of the configuration of a common voltage regulator.

With reference to FIG. 10, the common voltage regulator 200 comprises an average value calculator 201 and a common voltage data generator 203. The average value calculator 201 calculates the average value of image data Data on a per-line basis. In particular, the average value calculator 201 calculates the average value of image data Data written to the last pixel line of a panel block PB. For example, the average value calculator 201 calculates the average value Davg of image data Data written to the kth pixel line, which is the last pixel line of the first panel block PB1.

FIG. 11 is a view of an example of image data applied to the $k^{th}$ pixel line.

With reference to FIG. 11, $k^{th}$ image data written to the kth pixel line comprises first image data Data1 to $m^{th}$ image data Data[m]. The first image data Data1 is converted to a first data voltage and written to the first data line DL, and the $m^{th}$ image data Data[m] is converted to an $m^{th}$ data voltage and written to the $m^{th}$ data line DLm.

The first to $m^{th}$ image data Data1 to Data[m] is converted to a positive (+) or negative (−) data voltage. For example, when the data driver 120 operates by the horizontal 1-dot inversion method, the odd-numbered image data Data1, Data3, . . . , Data[m−1] is converted to a positive (+) voltage, and the even-numbered image data Data2, . . . , Data[m] is converted to a negative (−) data voltage. As used herein, image data that is converted to a positive (+) data voltage will be hereinafter referred to as positive image data, and image data that is converted to a negative (−) data voltage will be hereinafter referred to as negative image data. The positions of positive and negative image data on one line may vary depending on the inversion method.

The average value calculator 201 calculates (determines) the average value Davg of image data on a per-line basis by the following [Equation 1]:

$$Davg=(Data1+Data2+\ldots Data(m-1)+Data(m)/m \quad \text{[Equation 1]}$$

As shown in FIG. 5, positive image data corresponds to the range of 0G to 255G(+), and negative image data corresponds to the range of 0G to 255G(−). Thus, the absolute value of the average value calculated by the average value calculator 201 ranges from 0 to 255. The average value calculator 201 provides the average value Davg of image data for each line calculated as above to the common voltage data generator 203.

The common voltage data generator 203 compares the average value Davg with a preset threshold Dth. The common voltage data generator 203 outputs first common voltage data DVCOM1 when the absolute value of the average value Davg is at or above the threshold Dth and corresponds to positive data, and outputs second common voltage data DVCOM2 when the absolute value of the average value Davg is at or above the threshold Dth and corresponds to negative data. That is, as shown in FIG. 5, the common voltage data generator 203 outputs the first common voltage data DVCOM1 when the average value Davg corresponds to a first grayscale area GA1, and outputs the second common voltage data DVCOM2 when the average value Davg corresponds to a second grayscale area GA2. Although FIG. 5 illustrates a positive threshold value Dvh+ and a negative threshold value Dth−, the threshold is an absolute value without regard to its sign because the common voltage data generator 203 compares the absolute value of the average value Davg with the threshold.

The touch sensing circuit 150 decodes the first and second common voltage data DVCOM1 and DVCOM2 and outputs a first common voltage VCOM1 and a second common voltage VCOM2 during the touch sensing period Tt1. The first common voltage VCOM1 has a lower voltage level than the initial common voltage VCOM, and the second common voltage VCOM2 has a higher voltage level than the initial common voltage VCOM. The initial common voltage VCOM has the same voltage level as the common voltage VCOM applied during the display periods.

Figure 12:
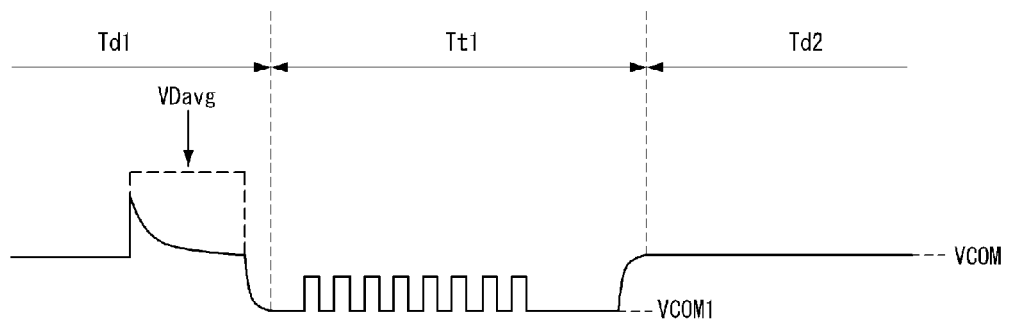
FIGS. 12 to 14 are views for explaining how the voltage level of a touch drive signal is kept stable during a touch sensing period according to example embodiments of the present invention.
Figure 13:
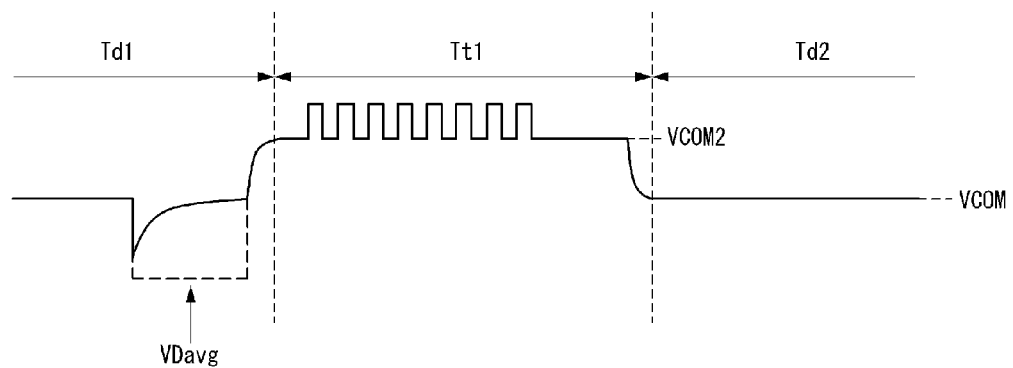
Figure 14:
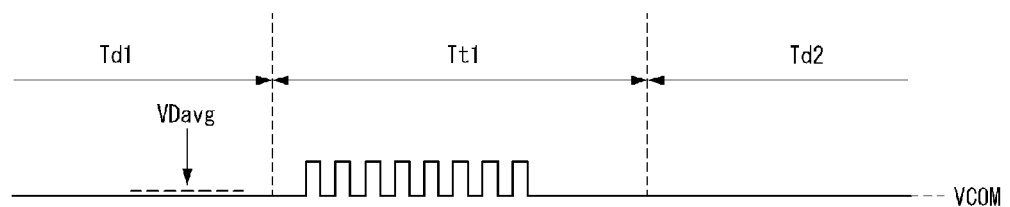

With reference to FIGS. 12 to 14, a method of eliminating noise in the touch sensing periods using variation of common voltage will be described below. The average data voltage VDavg depicted in example of FIGS. 12 to 14 may refer to a data voltage obtained by converting the average value Davg of image data for the $k^{th}$ horizontal line.

With reference to FIG. 12, when the average data voltage VDavg for the last line in the display period Td1 corresponds to the first grayscale area GA1, the common voltage VCOM decreases due to coupling at the end of the first display period Td1. During the first touch sensing period Tt1, the touch sensing circuit 150 outputs the first common voltage VCOM1, lower than the common voltage VCOM, as the initial value of the touch drive signal LFD. Thus, the voltage level of the common electrode VCL, after having decreased in the first display period Td1, does not return to the common voltage VCOM but is kept at the first common voltage VCOM1. As a result, the high level voltage of the touch drive signal LFD applied to the common electrode VCL does not change but is kept at a constant level, during the first touch sensing period Tt1. That is, the touch sensing circuit 150 may prevent touch noise caused by instability in the voltage level of the touch drive signal LFD.

With reference to FIG. 13, when the average data voltage VDavg for the last line in the display period Td1 corresponds to the second grayscale area GA2, the common voltage VCOM increases due to coupling at the end of the first display period Td1. During the first touch sensing period Tt1, the touch sensing circuit 150 outputs the second common voltage VCOM2, higher than the common voltage VCOM, as the initial value of the touch drive signal LFD. Thus, the voltage level of the common electrode VCL, after having increased in the first display period Td1, does not return to the common voltage VCOM but is kept at the second common voltage VCOM2. As a result, the high level voltage of the touch drive signal LFD applied to the common electrode VCL does not change but is kept at a constant level during the first touch sensing period Tt1. That is, the touch sensing circuit 150 may prevent touch noise caused by instability in the voltage level of the touch drive signal LFD.

With reference to FIG. 14, when the average data voltage VDavg for the last line in the display period Td1 is equal to the common voltage VCOM, no ripple occurs at the end of the first display period Td1. Thus, the touch sensing circuit 150 does not change the initial value of the touch drive signal LFD applied during the touch sensing period Tt1, but keeps it at the voltage level of the common voltage VCOM.

As shown in FIG. 14, when the average data voltage VDavg for the last line is equal to the common voltage VCOM, no ripple occurs. Therefore, the voltage level of the common voltage VCOM may not be varied. Further, even if the average data voltage VDavg for the last line is not exactly equal to the common voltage VCOM, a smaller voltage difference between the average data voltage VDavg for the last line and the common voltage VCOM will cause less ripple. Accordingly, the variation in the voltage level of the touch drive signal LFD is small enough to be ignored. Therefore, as mentioned above, there is no need to vary the level of the common voltage VCOM when the average data voltage VDavg for the last line is below the threshold Dth. That is, the threshold Dth is set to a value within a range in which a ripple in the common voltage, occurring in proportion to the average value Davg of image data can be ignored.

In an example embodiment of the present invention, a grayscale area where the level of the common voltage is varied is divided into the first grayscale area GA1 and the second gray scale area GA2. In example embodiments of the present invention, because the amount of ripple is proportional to the average value Davg of image data, the amount of variation in common voltage may be set to increase as the absolute value of the average value Davg of image data increases.

It will be apparent to those skilled in the art that various modifications and variations can be made in the display device with built-in touch sensors of the present disclosure without departing from the technical idea or scope of the disclosure. Thus, it is intended that the present disclosure cover the modifications and variations of this disclosure provided they come within the scope of the appended claims and their equivalents.

What is claimed is:

1. A display device, comprising:
a display panel having a pixel array with built-in touch sensors configured to be driven between a display period and a touch sensing period in a time-division manner, the pixels and the touch sensors sharing a common electrode;
a display drive circuit configured to output image data to the display panel during the display period;
a common voltage regulator configured to output common voltage data to indicate a voltage level of a common voltage to be applied to the common electrode during the touch sensing period; and
a touch sensing circuit configured to decode the common voltage data during the touch sensing period to vary the common voltage and to apply the varied common voltage to the common electrode to drive the touch sensors,
wherein the common voltage regulator is configured to determine an average value of image data for each line of the pixel array and to output a first common voltage data to decrease the voltage level of the common voltage to be applied to the common electrode during the touch sensing period when the average value is at or above a preset threshold and corresponds to positive image data.

2. The display device of claim 1, wherein the touch sensing circuit is further configured to apply a common voltage to the common electrode during the display period, and is configured to apply a first common voltage having a lower voltage level than the common voltage to the common electrode during the touch sensing period.

3. The display device of claim 2, wherein the common voltage regulator is further configured to output second common voltage data to the touch sensing circuit when the average value is at or above the preset threshold, and the touch sensing circuit is configured to apply the second common voltage having a higher voltage level than the common voltage during the touch sensing period.

4. The display device of claim 2, wherein, when the average value is below the preset threshold, the touch sensing circuit is further configured to maintain the voltage applied to the common electrode at the voltage level of the common voltage during the display period.

5. The display device of claim 1, wherein, during the touch sensing period, the touch sensing circuit applies a signal that alternates between the common voltage and a predetermined sensing high voltage higher than the common voltage to the common electrode.

6. The display device of claim 1, wherein the common voltage regulator is configured to determine the average value of image data output to the last pixel line during the display period.

7. The display device of claim 1, wherein the display panel includes first and second panel blocks, the display drive circuit is further configured to output image data to the first panel block during a first display period and to output image data to the second panel block during a second display period, and the common voltage regulator is configured to determine the average value of image data written to the last pixel line of the first panel block.

8. The display device of claim 1, wherein the image data for each line includes positive image data and negative image data, and the average value corresponds to positive data of gray levels 0 to 255 or negative data of gray levels 0 to 255.

9. The display device of claim 1, wherein the common voltage regulator is configured to output a lower voltage level for the first common voltage in response to a higher absolute value of the average value.

10. The display device of claim 3, wherein the touch sensing circuit is configured to apply a higher voltage level as the second common voltage for a larger difference between the absolute value of the average value and the preset threshold.

* * * * *